(No Model.)
P. RUDOLPH.
OBJECT GLASS.
No. 583,336.                    Patented May 25, 1897.
Fig. 1.
Fig. 2.
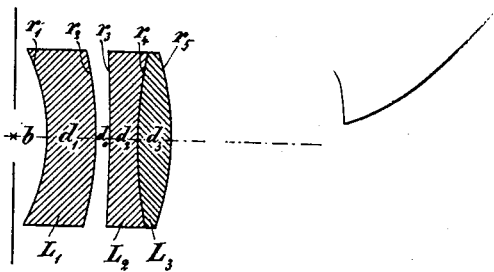
Fig. 3.
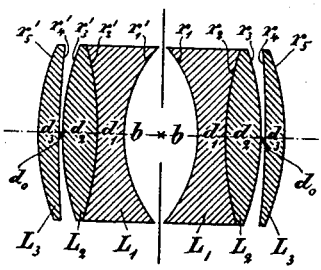
Flint   Crown
Witnesses:
Inventor
Paul Rudolph
by Marcellus Bailey
his atty

UNITED STATES PATENT OFFICE.

PAUL RUDOLPH, OF JENA, GERMANY, ASSIGNOR TO THE FIRM OF CARL ZEISS, OF SAME PLACE.

OBJECT-GLASS.

SPECIFICATION forming part of Letters Patent No. 583,336, dated May 25, 1897.

Application filed February 1, 1897. Serial No. 621,475. (No model.)

*To all whom it may concern:*

Be it known that I, PAUL RUDOLPH, doctor of philosophy, a subject of the Duke of Saxe-Altenburg, residing at Jena, in the Grand Duchy of Saxe-Weimar, German Empire, have invented a new and useful Object-Glass, of which the following is a specification.

The object of my invention is to provide a photographic objective which, while having a great intensity of light and over a wide field of view being well corrected as to astigmatism—that is to say, producing an anastigmatically-flattened image—meets even exceptional requirements as regards chromatic and spherical correction. This object is attained by rendering the principle of correction embodied in Gauss's telescope-objective serviceable for the purposes of the present invention.

Figure 1 represents the telescope-objective of Gauss. Fig. 2 represents an objective constructed according to the present invention. Fig. 3 represents a doublet objective composed of two object-lenses of the improved kind.

As is well known, Gauss has demonstrated that a double-lens objective enables both chromatic and spherical aberration to be corrected with great accuracy for a comparatively large aperture if such compound object-lens be constructed as illustrated in the section Fig. 1 of the accompanying drawings—that is, if it consists of a convex crown-glass meniscus A and a convexo-concave flint-glass lens B, the two surfaces whereof, which are turned toward each other and are separated by air, differing materially in their curvatures, so that they may not be cemented together. Unlike the types of object-glasses of Fraunhofer, Littrow, and others, in which the faces turned toward each other have practically equal curvatures and are generally cemented together, the type of objective devised by Gauss is liable to undergo on the basis of a proper distribution or arrangement of the curvatures a correction of the spherical aberration for two different colors, so that the so-called "chromatic" difference of the spherical aberration is done away with and both aberrations are effaced over an area corresponding to a large aperture. Objectives of this description have been repeatedly and successfully applied to astronomical telescopes, both the arrangements of lenses that are practicable—viz., crown first and flint first—having been tried; but before the present invention no advantageous application of this type of compound lens to photographic objectives has to my knowledge been either made or deemed feasible. Such application is attained in the first place by imparting to Gauss's objective the property of producing an anastigmatically-flattened image, (which is so desirable for photographic-lens systems, but which has hitherto not been realized in the said objective,) and, secondly, by achromatizing such anastigmatic objective in a novel manner satisfactory for photographic purposes. In attempting to attain this result considerable difficulty has been experienced, owing to the narrow range of suitable sorts of glass.

It has been found that in an objective of great aperture a perfect anastigmatic flattening of the image may be secured only with lenses either of considerable thickness or placed at a great distance apart. Furthermore, a sufficient chromatic correction, while attainable in the astronomical objective with any given pair of crown and flint glass, which need not produce an anastigmatically-flattened image and which has hitherto been constructed with lenses of but little thickness and placed at a short distance from each other, in an anastigmatic objective of a comparatively large aperture may be insured only where the dispersive power of the flint-glass, as expressed by the formula $\frac{\Delta n}{n-1}$, has a comparatively great value—viz., about double the value of the dispersive power of the crown-glass. Such a pair of lenses, however, is unsuited for photographic purposes, inasmuch as it would have to comprise a very heavy flint-glass. According to the present invention this drawback is obviated in the following manner.

In the lens system shown in Fig. 1 either one lens, A, or the other lens, B, or both, consist each of a positive (biconvex) lens and of a negative (biconcave) lens cemented to the first and formed of glass having the same, or nearly the same, refractive power as the glass of the positive component, but different dispersive power. A lens so composed will, as regards all the effects dependent upon refraction—viz., focal length, the location of the cardinal points, and spherical aberration of every description—be exactly identical with a single homogeneous lens of like external curvatures and equal thickness, while as regards chromatic dispersion the compound lens is equivalent to a single lens with like curvatures and of a like thickness, but made of glass having a dispersive power different from those which actually occur in either part of the combination. More specifically, the resulting dispersive power of the compound lens is less than the least dispersive power of the component lenses—that is to say, the compound lens is achromatic or partially achromatic—if the positive component (in case the compound lens is a positive lens A) or the negative component (in case the compound lens is a negative lens B) consists of glass of less dispersive power, and the resulting dispersive power of the compound lens is greater than that of either component—that is to say, the compound lens is hyperchromatic—if (in case the compound lens is a negative lens B) the positive component is formed of glass of less dispersive power than that of which the negative component is formed. The former fact agrees with the well-known rules of achromatization of lenses and the latter with the demonstrations respecting hyperchromatic dispersing-lenses contained in my pending application for patent, Serial No. 598,261. The value of the resulting dispersive power of the compound lens in all these cases depends upon the values of the dispersive power of the glasses employed in forming the two components and upon the ratio of the total curvatures or of the focal lengths of both components. It depends, consequently, if the outer curvatures of the compound lens are given, upon the radius of curvature common to the inner surfaces united by cement. Such value may therefore be calculated in each individual case by means of well-known formulæ.

By the stated manner of composing the lenses A and B of a lens system of the Gauss type every required ratio of their dispersive powers may be realized without causing the lenses to differ from non-composite lenses of glass of the same thickness and outer curvatures as regards the effect of refraction and the spherical aberrations by which refraction is attended.

In order to correct spherical aberration and to anastigmatically flatten the image, the outer curvatures and thicknesses of the lenses A and B consequently may be determined beforehand regardless of the dispersive powers of the particular kinds of glass to be employed, while the ratio of the resulting dispersing powers of the lenses A and B requisite for the proper correction of the chromatic aberrations can be readily established subsequently by properly determining the inner radius of curvature of the components to be cemented of either or both lenses. In the practice of this method values of the said ratio result, which in the case of non-composite lenses could only be obtained by employing a flint-glass of a very high dispersive power, but which with lenses constructed as above explained are produced by crown and flint glasses, exhibiting but slightly different dispersive powers, provided such glasses possess an equal or approximately equal refractive power. Pairs of glasses which meet these requirements in sufficient range of gradations form part of the kinds of optical glass which are constantly for sale at the Jena Glass Works. The condition of identical refractive power need only of course be fulfilled approximately, inasmuch as slight differences in the indices of refraction between the cemented components, even where the curvature of the inner surface is very marked, influence the corrections to only a comparatively insignificant extent and may be easily introduced into the computations. Indeed, a little difference in the refractive power—say a few units in the third place after the decimal point—may even prove advantageous, since, owing to such a difference, a more perfect equalization of the so-called "zones" of the spherical aberration may become feasible. Apart from this no essential variation or departure from principle is involved in the construction of object-pieces of the new type should some medium other than air be interposed between the constituent parts of such object-piece, the one important condition being that such separating or spacing medium should possess an uncommonly small exponent index of refraction in comparison with the exponents of the different kinds of glass employed.

The objective producing an anastigmatically-flattened image, as herein described, should preferably be corrected by placing the diaphragm in front of the objective, as illustrated by way of example in Fig. 2 of the drawings; but it will still display a noticeable "coma," and, like any anastigmatic objective with the diaphragm in front of it, it will be attended with the defect of orthoscopic distortion of the image. These two drawbacks may without difficulty be obviated, however, by constructing a double object-glass with a central or intermediate diaphragm, the objective hereinbefore described being utilized as one of the constituent elements thereof. An example of this modified form of the improved object-lens is given in Fig. 3.

In the following examples, given by way of illustration of some forms of the new objective represented in Figs. 2 and 3, I have introduced the following symbols:

The letters $r'$ $r^2$ $r^3$ $r^4$ $r^5$ designate the radii of the spherical ground-lens surfaces.

$d'$ $d^2$ $d^3$ are the central thicknesses of the lenses.

$b$ indicates the central distance between the diaphragm and the lens; $d^0$, the central distance between the main parts of the lens system; L' L² L³, the lenses themselves, and D the diameter of the lenses.

In the following tables radii, thicknesses, and diameter of the lenses are expressed in relative numbers, the focal length of the complete objective being taken as a unit. By simply multiplying these numbers by the focal length required in any given case the dimensions of an objective possessing the requisite focal length will be found.

In order to characterize the different sorts of glass employed, there are given the refractive indices $n^D$ and $n^{G'}$, relating, respectively, to the D line of the solar spectrum and to the H$\gamma$ line of the hydrogen spectrum. Besides, for each kind of glass the value of the dispersive power $\frac{\triangle n}{n-1}$ is mentioned, $\triangle n$ being calculated for the interval between D and H$\gamma$, while for $n$ the value $n^D$ is adopted.

Example 1: An astigmatically, spherically, and chromatically corrected object-lens with a front diaphragm, as shown in Figs. 2. The relative aperture of the objective is equal to one-ninth of the focal length. The objective consists of two components separated from each other by air, the negative component being a single lens L', while the positive part is made up of a dispersing-lens L² and of a collecting-lens L³, both cemented together. The refractive indices of both sorts of glass employed in making the lenses L² and L³ are approximately equal, while the glass of which the lens L² is formed is the one possessing the higher dispersive power of the two.

Dimensions for a focal length = 1
Maximum relative aperture = .111.

| Radii. | Thicknesses and Distances. |
|---|---|
| $r'=-$ .1164 | $d'=$ .0320 |
| $r^2=-$ .2215 | $d^2=$ .0172 |
| $r^3=-1.6097$ | $d^3=$ .0222 |
| $r^4=+$ .2708 | $d^0=$ .0086 |
| $r^5=-$ .1760 | $b=$ .0197 |

Descriptions of Glass.

| | $n^D$. | $n^{G'}$. | $\frac{\triangle n}{n-1}$. |
|---|---|---|---|
| L': | 1.57210 | 1.58997 | .03124 |
| L²: | 1.51158 | 1.52344 | .02318 |
| L³: | 1.51111 | 1.52127 | .01988 |

Example 2: An astigmatically, spherically, and chromatically corrected doublet objective with an intermediate diaphragm. (Shown in Fig. 3.) Relative aperture one-fourth. The objective is constructed symmetrically in relation to the intermediate diaphragm, each part consisting of two pieces separated from each other by air, the positive piece consisting of the single lens L³, while the negative piece is made up of the positive lens L² and of the negative lens L', cemented thereto, the refractive indices of L² and L' being approximately equal, but L' having the higher dispersive power.

Dimensions for a focal length = 1
Maximum relative aperture = .25

| Radii. | Thicknesses and Distances. |
|---|---|
| $r'=-r''=-$ .1954 | $d'=$ .0411 |
| $r^2=-r^{2'}=+$ .4370 | $d^2=$ .0514 |
| $r^3=-r^{3'}=-$ .3599 | $d^3=$ .0308 |
| $r^4=-r^{4'}=-1.5424$ | $d^0=$ .0026 |
| $r^5=-r^{5'}=-$ .3147 | $b=$ .0514 |

Descriptions of Glass.

| | $n^D$. | $n^{G'}$. | $\frac{\triangle n}{n-1}$. |
|---|---|---|---|
| L': | 1.57631 | 1.59227 | .02769 |
| L²=L³: | 1.57244 | 1.58512 | .02215 |

What I claim, and desire to secure by Letters Patent of the United States, is—

A compound objective which gives an anastigmatically-flattened image, consisting of two lenses (separated from each other by a medium of little refractive power), viz: one positive lens and one negative lens, at least one of which lenses is made up of two constituent parts united by cement and formed of two different sorts of glass of unequal dispersive power but nearly equal refractive power, essentially as shown and described.

In testimony whereof I have hereunto set my hand in the presence of two subscribing witnesses.

PAUL RUDOLPH.

Witnesses:
RUDOLPH FRICKE,
OTTO WOEDERLEIN.